United States Patent
Ohta et al.

(10) Patent No.: US 12,065,015 B2
(45) Date of Patent: Aug. 20, 2024

(54) COOLING STRUCTURE

(71) Applicant: TOYOTA JIDOSHA KABUSHIKI KAISHA, Toyota (JP)

(72) Inventors: Hiroaki Ohta, Okazaki (JP); Yuki Fukuzawa, Kawanishi (JP); Daisuke Miyata, Osaka-fu (JP); Shogo Hattori, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 295 days.

(21) Appl. No.: 17/824,284

(22) Filed: May 25, 2022

(65) Prior Publication Data

US 2022/0379682 A1 Dec. 1, 2022

(30) Foreign Application Priority Data

May 27, 2021 (JP) .................................. 2021-088932

(51) Int. Cl.
*B60K 1/02* (2006.01)
*B60H 1/00* (2006.01)
*B60H 3/06* (2006.01)

(52) U.S. Cl.
CPC ....... *B60H 1/00278* (2013.01); *B60H 3/0608* (2013.01); *B60H 2001/006* (2013.01)

(58) Field of Classification Search
CPC .... B60K 1/02; H01M 10/613; B60H 1/00278
See application file for complete search history.

(56) References Cited

U.S. PATENT DOCUMENTS

| | | | | |
|---|---|---|---|---|
| 5,510,207 A * | 4/1996 | Grivel | ................ | H01M 10/625 429/120 |
| 5,589,290 A * | 12/1996 | Klink | .................. | H01M 10/613 429/99 |
| 6,074,774 A * | 6/2000 | Semmens | ......... | H01M 10/0468 429/94 |
| 7,045,236 B1 * | 5/2006 | Andrew | .............. | H01M 10/613 429/83 |
| 8,042,637 B2 * | 10/2011 | Nagata | ..................... | B60K 1/04 180/68.5 |
| 8,679,662 B2 * | 3/2014 | Maguire | ............. | H01M 50/249 180/68.5 |

(Continued)

FOREIGN PATENT DOCUMENTS

| | | |
|---|---|---|
| JP | 2007-172939 A | 7/2007 |
| JP | 2015-085859 A | 5/2015 |
| JP | 2018-016143 A | 2/2018 |

*Primary Examiner* — Jason D Shanske
*Assistant Examiner* — James J Triggs
(74) *Attorney, Agent, or Firm* — Dinsmore & Shohl LLP

(57) ABSTRACT

A cooling structure includes a fan that suctions gas through an inlet and sends gas, a flow path that connects the inlet and the fan to each other, a foreign matter entry suppression member that suppresses entry of a foreign matter into the flow path through the inlet, and a vibration suppression member set between the foreign matter entry suppression member and the fan and provided to suppress vibration of a rod-like foreign matter caused by rotation of a blade of the fan. The foreign matter entry suppression member includes a plurality of opening portions for suctioning gas into the flow path. The vibration suppression member is constructed to be provided with a plurality of opening portions while it is set in the flow path.

4 Claims, 7 Drawing Sheets

(56) References Cited

U.S. PATENT DOCUMENTS

| | | | | |
|---|---|---|---|---|
| 8,733,430 B2* | 5/2014 | Kikuchi | .................. | B60L 1/003 |
| | | | | 165/41 |
| 9,991,570 B2* | 6/2018 | Tanaka | ................ | H01M 10/625 |
| 10,486,526 B2* | 11/2019 | Ajisaka | .................. | B60K 11/04 |
| 10,744,901 B2* | 8/2020 | Cardoso | .............. | H01M 10/663 |
| 11,509,003 B2* | 11/2022 | Iwakura | ............ | H01M 10/6557 |
| 2001/0023963 A1* | 9/2001 | Iida | ..................... | H01L 27/0817 |
| | | | | 257/355 |
| 2003/0082438 A1* | 5/2003 | Kwon | ................. | H01M 10/613 |
| | | | | 429/120 |
| 2007/0141455 A1 | 6/2007 | Marukawa et al. | | |
| 2016/0294026 A1 | 10/2016 | Tsuchiya et al. | | |

* cited by examiner

COOLING STRUCTURE

CROSS REFERENCE TO RELATED APPLICATIONS

This nonprovisional application claims priority to Japanese Patent Application No. 2021-088932 filed with the Japan Patent Office on May 27, 2021, the entire contents of which are hereby incorporated by reference.

BACKGROUND

Field

The present disclosure relates to a cooling structure that cools a power storage mounted on a vehicle.

Description of the Background Art

A vehicle including a power storage and a cooling structure that cools the power storage has conventionally been known. For example, Japanese Patent Laying-Open No. 2007-172939 discloses a battery pack including a battery stack as the power storage and a cooling fan and an inlet as the cooling structure. The inlet is provided in a side surface located in the vicinity of the cooling fan. In a front surface of the inlet, a louver for preventing entry of a foreign matter is disposed.

SUMMARY

In the battery pack in Japanese Patent Laying-Open No. 2007-172939, when a rod-like foreign matter having a length extending from the inlet to the cooling fan enters the inside of the battery pack through the louver, the rod-like foreign matter vibrates due to rotation of the cooling fan. Thus, noise may be produced or the rod-like foreign matter may protrude to the outside.

The present disclosure was made in view of the problem above, and an object thereof is to provide a cooling structure that can lower a volume of noise produced by a rod-like foreign matter having a length extending from an inlet to a fan and suppress protrusion of the rod-like foreign matter to the outside in the event of entry of the rod-like foreign matter into the cooling structure.

According to one aspect of the present disclosure, a cooling structure that cools a power storage includes an inlet for intake toward the power storage, a fan including a blade, the fan suctioning gas through the inlet by rotation of the blade and sending the gas toward the power storage, a flow path that connects the inlet and the fan to each other, a foreign matter entry suppression member provided at the inlet, the foreign matter entry suppression member suppressing entry of a foreign matter into the flow path through the inlet, and a vibration suppression member set between the foreign matter entry suppression member and the fan in the flow path and provided to suppress vibration of a rod-like foreign matter caused by rotation of the blade. The foreign matter entry suppression member includes a plurality of first opening portions for suction of the gas into the flow path. The vibration suppression member is constructed to be provided with a plurality of second opening portions while the vibration suppression member is set in the flow path.

According to such a construction, the vibration suppression member can suppress vibration of the rod-like foreign matter based on rotation of the blade of the fan. Therefore, with the cooling structure, the volume of noise produced by vibration of the rod-like foreign matter can be lowered and protrusion of the rod-like foreign matter to the outside can be suppressed.

In some embodiments, the rod-like foreign matter is moved by contact of a tip end of the rod-like foreign matter with the blade. The fan includes a rotation shaft that rotates the blade. The vibration suppression member restricts a range of movement of the rod-like foreign matter in a direction intersecting with an axial direction of the rotation shaft. According to such a construction, the vibration suppression member can suppress vibration of the rod-like foreign matter.

In some embodiments, the second opening portions are each larger in opening than the first opening portions. According to such a construction, with the second opening portions, vibration of the rod-like foreign matter can be suppressed. Furthermore, lowering in air intake efficiency by the vibration suppression member can be prevented.

In some embodiments, the vibration suppression member includes a plurality of ledges that intersect with each other or a single ledge. According to such a construction, the structure of the vibration suppression member can be simplified. The foregoing and other objects, features, aspects and advantages of the present disclosure will become more apparent from the following detailed description of the present disclosure when taken in conjunction with the accompanying drawings.

DETAILED DESCRIPTION

Figure 1:
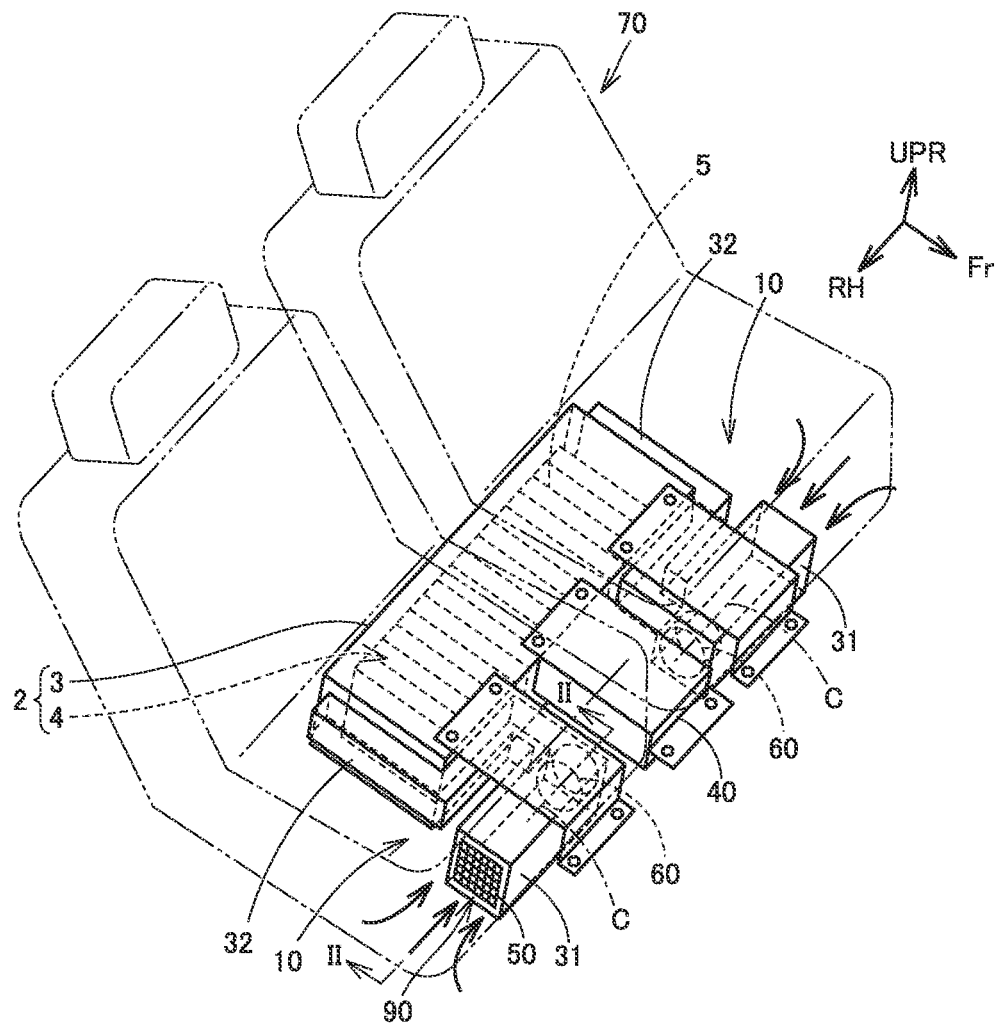
FIG. 1 is a schematic diagram showing a cooling structure.

An embodiment of the present disclosure will be described below with reference to the drawings. Identical members in the description below have the same reference characters allotted and their labels and functions are also the same. Therefore, detailed description thereof will not be repeated. When the number or an amount is mentioned in the embodiment described below, the scope of the present disclosure is not necessarily limited to the number or the amount unless otherwise specified.

FIG. 1 is a schematic diagram showing a cooling structure in an embodiment. A vehicle including the cooling structure in the embodiment and a schematic construction of the cooling structure will be described with reference to FIG. 1.

As shown in FIG. 1, a cooling structure 10 according to the embodiment is mounted on a vehicle on which a power storage 2 is mounted. Specifically, cooling structure 10 in the present embodiment is mounted on a vehicle such as a hybrid vehicle that can travel with driving force of at least one of a motor and an engine or an electrically powered vehicle that travels with driving force of a motor obtained by electrical energy.

Power storage 2 supplies electric power to the motor. On the other hand, power storage 2 is charged with electric power generated by the motor in regenerative braking or the like. Power storage 2 is provided, for example, under a rear seat 70. A position where power storage 2 is set is not limited to a position under rear seat 70, and may be set on a rear side of rear seat 70. Power storage 2 can be set as appropriate.

Power storage 2 is in a longitudinal shape that extends along a direction of a vehicle width. Power storage 2 includes a casing 3 and a power storage module 4. Power storage module 4 is accommodated in casing 3. Power storage module 4 is composed of a plurality of power storage cells 5 connected in series. The number of power storage cells 5 is not particularly limited.

Power storage cell 5 is a secondary battery such as a nickel metal hydride battery or a lithium ion battery. Power storage cell 5 is, for example, in a prismatic shape. The secondary battery may contain a liquid electrolyte or a solid electrolyte. Power storage cell 5 is not limited to the secondary battery, and a capacitor or the like in which electric power can be stored may be applicable.

Cooling structure 10 cools power storage 2. Cooling structure 10 is constructed to suction air in a vehicle compartment from a lower side of rear seat 70 and from a side surface side of rear seat 70 on an outer side of the vehicle. Cooling structure 10 includes an inlet 90, a foreign matter entry suppression member 50, ducts 31 and 32, and a fan 60.

Foreign matter entry suppression member 50 is provided at inlet 90. Foreign matter entry suppression member 50 suppresses entry of a foreign matter into duct 31 through inlet 90. Foreign matter entry suppression member 50 is typically made up of an intake louver or an intake grille.

Ducts 31 and 32 guide air in the vehicle compartment to power storage module 4. Ducts 31 and 32 are connected to fan 60. Duct 31 guides air in the vehicle compartment suctioned through inlet 90 to fan 60. Duct 32 guides air blown from fan 60 to the power storage (specifically, power storage module 4).

By driving fan 60, air in the vehicle compartment is sent into casing 3. Specifically, fan 60 includes a blade. As the blade rotates, air in the vehicle compartment is suctioned through inlet 90 and sent toward power storage 2.

Cooling structure 10 is provided on each of opposing end sides in a lateral direction of the vehicle. Fan 60 is arranged on the lower side of rear seat 70 and on a front side of power storage module 4. A component box 40 in which electronic components for controlling the power storage module are accommodated is arranged between two fans 60.

Figure 2:
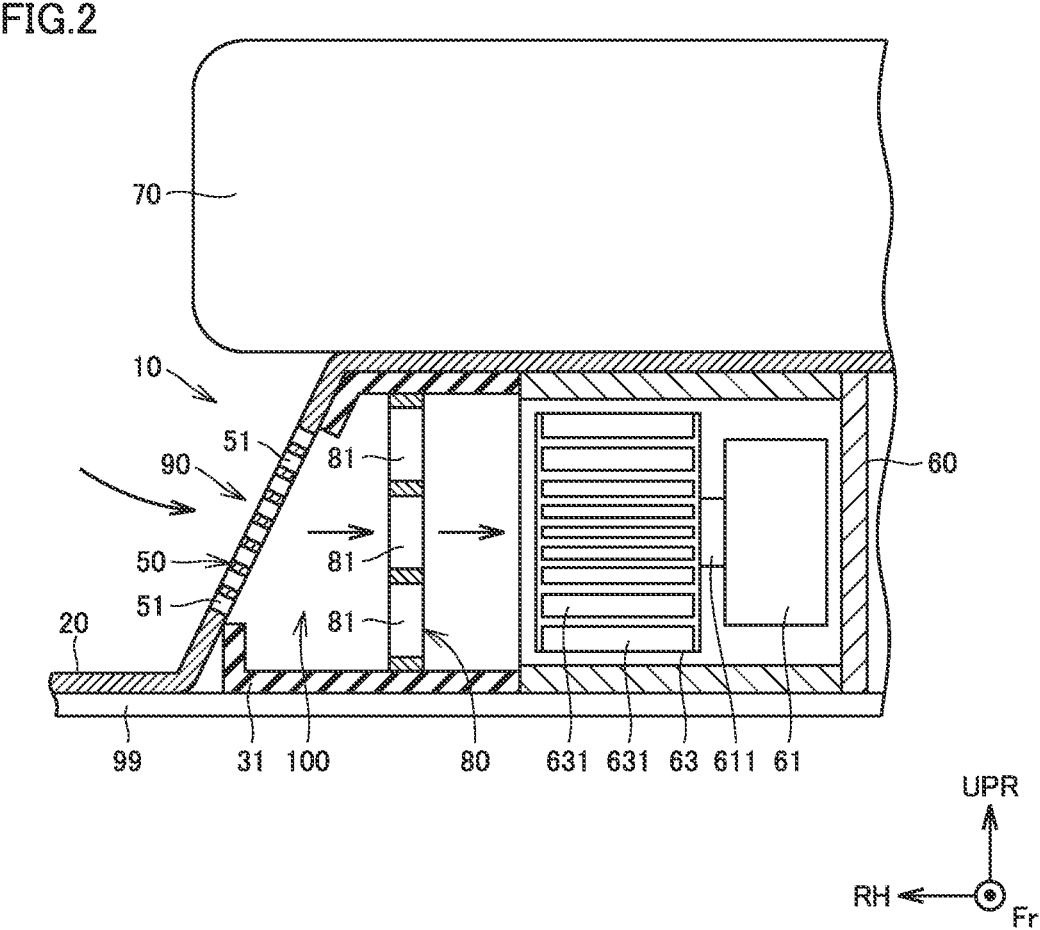
FIG. 2 is a cross-sectional view along the line II-II in FIG. 1.

FIG. 2 is a cross-sectional view along the line II-II in FIG. 1. As shown in FIG. 2, cooling structure 10 includes duct 31, inlet 90, foreign matter entry suppression member 50, a vibration suppression member 80, fan 60, and a flow path 100.

Inlet 90 is provided for intake toward power storage 2. Flow path 100 connects inlet 90 and fan 60 to each other.

Inlet 90 is provided to open into the vehicle compartment. In the present example, inlet 90 is provided in a door scuff 20 of the vehicle.

Fan 60 includes a motor 61 and an impeller portion 63. Motor 61 includes a rotation shaft (shaft) 611. Impeller portion 63 includes a plurality of blades 631. Impeller portion 63 is connected to rotation shaft 611 and rotates with rotation of motor 61. Rotation shaft 611 thus rotates blades 631 as motor 61 rotates. In the present example, a sirocco fan is employed as fan 60. A type of fan 60 is not limited as such, and for example, another type of fan such as a turbo fan may be employed. In the present example, fan 60 and duct 31 are set on a body 99 of the vehicle.

Foreign matter entry suppression member 50 is provided with a plurality of opening portions 51. The plurality of opening portions 51 are provided in a portion 52 as being aligned in matrix (see FIG. 1). As fan 60 is driven, air in the vehicle compartment is suctioned through the plurality of opening portions 51. Foreign matter entry suppression member 50 suppresses entry of a foreign matter into flow path 100 through inlet 90.

Vibration suppression member 80 is provided in flow path 100 that connects inlet 90 and fan 60 to each other. Vibration suppression member 80 is set between foreign matter entry suppression member 50 and fan 60 in flow path 100. Vibration suppression member 80 includes a plurality of opening portions 81. Vibration suppression member 80 is provided to suppress vibration of a foreign matter. Vibration suppression member 80 is set as being opposed to fan 60. Vibration suppression member 80 is constructed such that the plurality of opening portions 81 face fan 60.

Figure 3:
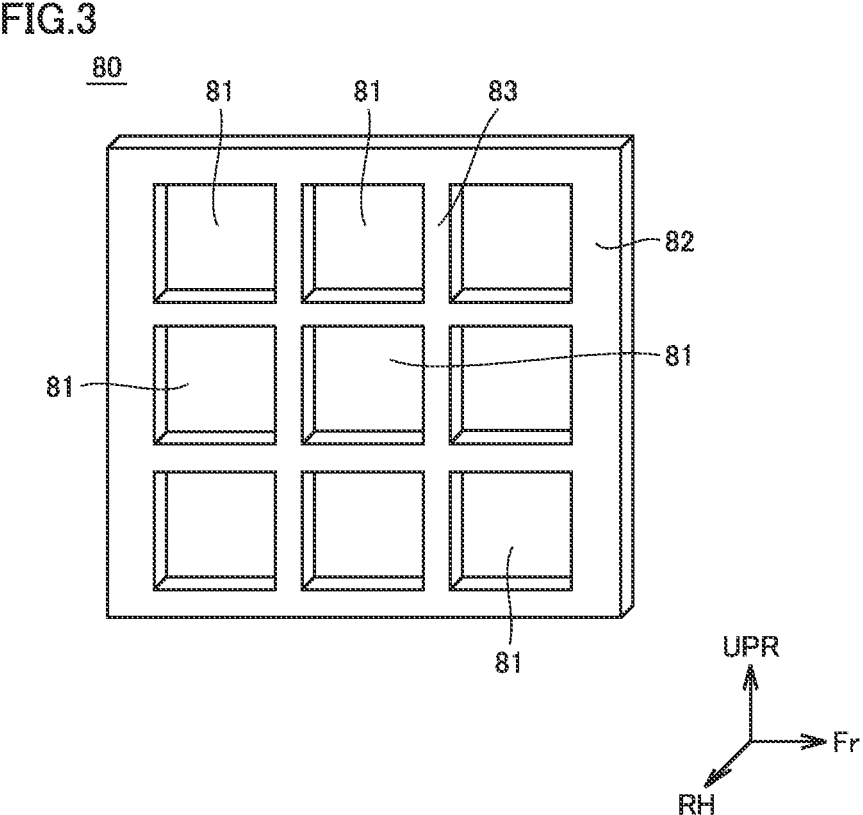
FIG. 3 is a diagram exemplifying a specific construction of a vibration suppression member.

FIG. 3 is a diagram exemplifying a specific construction of vibration suppression member 80. As shown in FIG. 3, vibration suppression member 80 includes the plurality of opening portions 81, a frame body 82, and a grid portion 83 that is provided in frame body 82 and defines the plurality of opening portions 81. The plurality of opening portions 81 are provided as being aligned in matrix. Vibration suppression member 80 is constructed such that the plurality of opening portions 81 are aligned in matrix within frame body 82. Each opening portion 81 is larger in opening than opening portion 51 of foreign matter entry suppression member 50.

Figure 4:
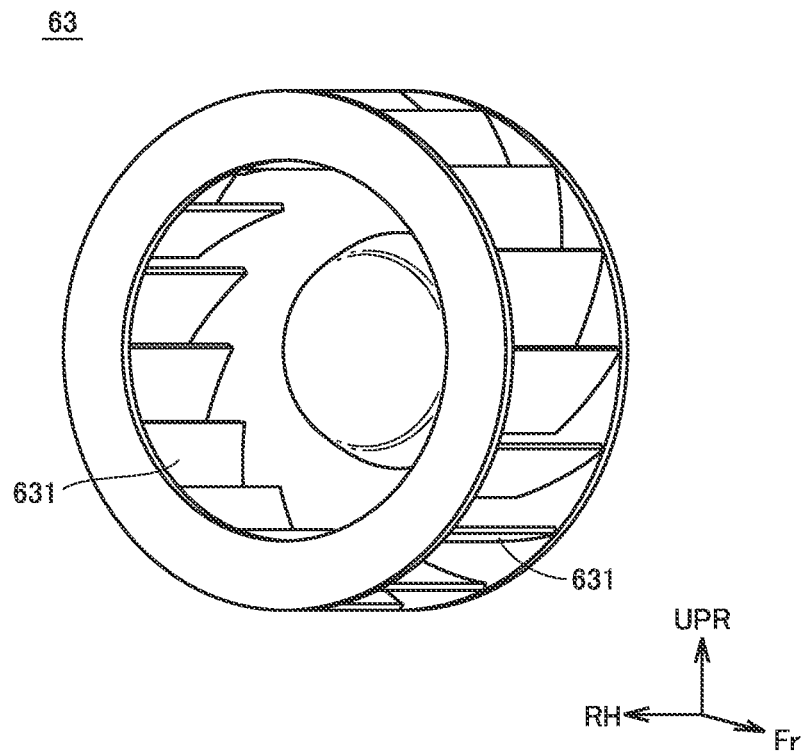
FIG. 4 is a diagram exemplifying a specific construction of an impeller portion.

FIG. 4 is a diagram exemplifying a specific construction of impeller portion 63. As shown in FIG. 4, impeller portion 63 includes a plurality of blades 631. The plurality of blades 631 are arranged at regular intervals along a direction of rotation of impeller portion 63.

Figure 5:
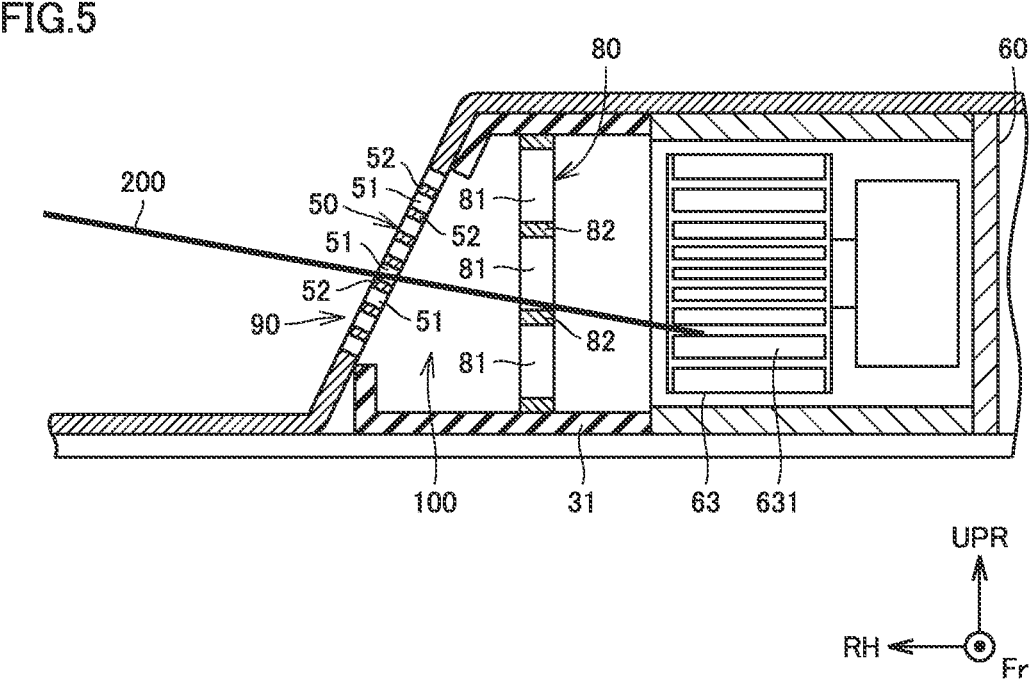
FIG. 5 shows a state that a part of a rod-like foreign matter has entered the inside of the cooling structure while a fan is not driven.

FIG. 5 shows a state that a part of a rod-like foreign matter 200 has entered the inside of cooling structure 10 while fan 60 is not driven. As shown in FIG. 5, rod-like foreign matter 200 having a length extending from inlet 90 to fan 60 may enter flow path 100 through one of the plurality of opening portions 51. Rod-like foreign matter 200 has reached a position of fan 60 through one of the plurality of opening portions 81.

In the example in FIG. 5, rod-like foreign matter 200 is supported by a wall portion of foreign matter entry suppression member 50 in a portion that defines a lower side of one opening portion 51, a wall portion of vibration suppression member 80 in a portion that defines a lower side of one opening portion 81, and blade 631.

Examples of rod-like foreign matter 200 include a foreign matter in a form of a skewer. Examples of rod-like foreign matter 200 include a metal or non-metal skewer used in barbecue. Rod-like foreign matter 200 has a diameter and a length of 2.3 mm and 300 mm, respectively, by way of example.

Figure 6:
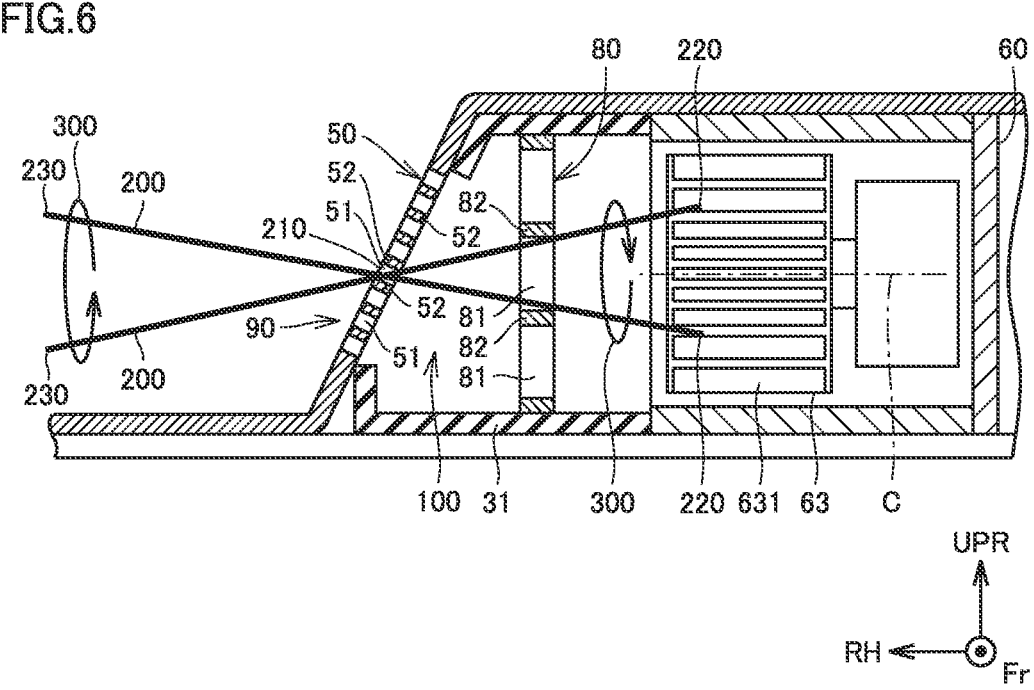
FIG. 6 is a diagram showing a vibrating state of the rod-like foreign matter when the fan is driven.

FIG. 6 is a diagram showing a vibrating state of rod-like foreign matter 200 when fan 60 is driven. As shown in FIG. 6, rotation of blade 631 applies force to an end 220 (which is also referred to as a "tip end 220" below) in contact with blade 631, of opposing ends 220 and 230 of rod-like foreign matter 200. Force from fan 60 is applied to tip end 220. Tip end 220 serves as a point of application of force. Therefore, tip end 220 is moved by coming in contact with blade 631.

As described above, opening of opening portion 81 is larger in size than opening of opening portion 51. While fan 60 remains stopped, rod-like foreign matter 200 is supported by opening portion 81 and opening portion 51. Therefore, when fan 60 is driven, rod-like foreign matter 200 vibrates with a portion located in opening portion 51 (a supported portion 210 which will be described later) being defined as a fulcrum.

In this case, tip end 220 draws a trajectory 300 resulting from rotation around a prescribed rotation axis. FIG. 6 shows an example in which tip end 220 draws a circular trajectory 300. For example, in one aspect, rod-like foreign matter 200 is located at opening portion 51 and vibrates in such a manner that supported portion 210 supported by foreign matter entry suppression member 50 corresponds to a vertex of a conical surface and a rod-like portion from supported portion 210 to tip end 220 draws a trajectory 300 along the conical surface.

Vibration suppression member 80 suppresses vibration of rod-like foreign matter 200 based on rotation of blade 631. Vibration suppression member 80 restricts a range of movement of rod-like foreign matter 200 in a direction intersecting with an axial direction C of rotation shaft 611 of motor 61. Vibration suppression member 80 restricts the range of movement of rod-like foreign matter 200 by opening portion 81.

When rod-like foreign matter 200 passes through opening portion 81 and tip end 220 comes in contact with blade 631, the range of movement of rod-like foreign matter 200 is restricted at opening portion 81. At opening portion 81, the range of movement of rod-like foreign matter 200 is restricted at least in an upward/downward direction and a front/rear direction of the vehicle by the wall portion of vibration suppression member 80 that defines opening portion 81.

Figure 7:
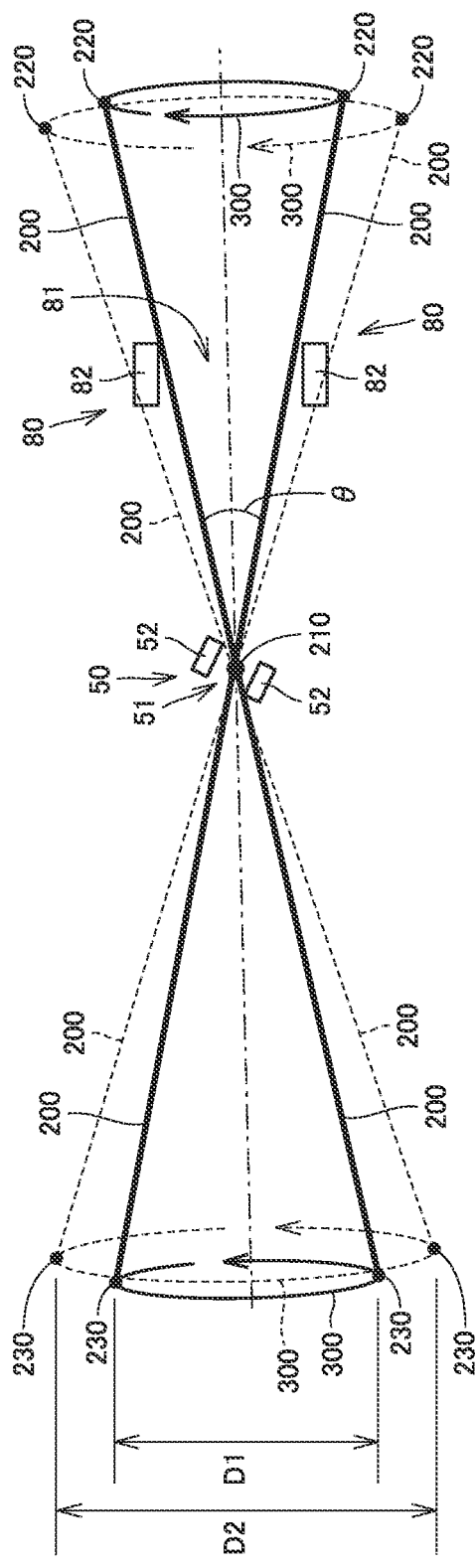
FIG. 7 is a diagram for illustrating a vibration suppression effect by the vibration suppression member.

FIG. 7 is a diagram for illustrating a vibration suppression effect by vibration suppression member 80. As shown in FIG. 7, a vibrating state of rod-like foreign matter 200 with vibration suppression member 80 being set in cooling structure 10 is shown with a solid line. A vibrating state of rod-like foreign matter 200 with vibration suppression member 80 having been removed from cooling structure 10 (vibration suppression member 80 not being set in the cooling structure) is shown with a dashed line.

By providing vibration suppression member 80 in cooling structure 10, a part of rod-like foreign matter 200 comes in contact with the wall portion of vibration suppression member 80 that defines opening portion 81. Therefore, in cooling structure 10, motion (vibration) of rod-like foreign matter 200 is suppressed more than in an example where there is no vibration suppression member 80 (shown with the dashed line). With vibration suppression member 80, a value of a vertical angle θ of the conical surface can be made smaller. Since vibration suppression member 80 thus suppresses vibration of rod-like foreign matter 200, the volume of noise can be lower than in the construction without vibration suppression member 80.

Rod-like foreign matter 200 may protrude into the vehicle compartment due to component force of centrifugal force applied to rod-like foreign matter 200 by rotation of blade 631. In particular, when a portion of rod-like foreign matter 200 that protrudes into the vehicle compartment is longer in length than a portion thereof that has entered the inside of cooling structure 10, component force of centrifugal force of the protruding portion becomes large. With vibration suppression member 80, a diameter of a circle which is the trajectory 300 of a rear end 230 of rod-like foreign matter 200 can be made smaller. For example, as illustrated, the diameter of the circle can be set to D1 (<D2) from D2. Accordingly, component force of centrifugal force can be made smaller. Therefore, protrusion of rod-like foreign matter 200 into the vehicle compartment due to rotation of blade 631 can be suppressed.

By reducing the size of opening portion 51 of foreign matter entry suppression member 50, rod-like foreign matter 200 can be prevented from passing through opening portion 51. On the other hand, an amount of suction of air per unit time by fan 60 is lowered, and hence a cooling effect is lowered. Then, by providing vibration suppression member 80 as above, lowering in cooling effect can be suppressed without reducing the size of opening portion 51.

As set forth above, cooling structure 10 that cools power storage 2 includes inlet 90 for intake toward power storage 2, fan 60 including blade 631, fan 60 suctioning air through inlet 90 by rotation of blade 631 and sending air toward power storage 2, flow path 100 that connects inlet 90 and fan 60 to each other, foreign matter entry suppression member 50 provided at inlet 90, foreign matter entry suppression member 50 suppressing entry of a foreign matter into flow path 100 through inlet 90, and vibration suppression member 80 set between foreign matter entry suppression member 50 and fan 60 in flow path 100 and provided to suppress vibration of a rod-like foreign matter caused by rotation of blade 631. Foreign matter entry suppression member 50 includes a plurality of opening portions 51 for suction of air into flow path 100. Vibration suppression member 80 is constructed to be provided with a plurality of opening portions 81 while it is set in flow path 100. According to such a construction, the volume of noise due to vibration of rod-like foreign matter 200 can be lowered and protrusion of rod-like foreign matter 200 into the vehicle compartment can be suppressed.

As described above, when rod-like foreign matter 200 having a length extending from inlet 90 to fan 60 enters flow path 100 through one of the plurality of opening portions 51, vibration suppression member 80 suppresses vibration of rod-like foreign matter 200 based on rotation of blade 631.

As described above, rod-like foreign matter 200 is moved by contact of tip end 220 thereof with blade 631. Fan 60 includes rotation shaft 611 that rotates blade 631. Vibration suppression member 80 restricts a range of movement of rod-like foreign matter 200 in a direction intersecting with axial direction C of rotation shaft 611. According to such a construction, vibration of rod-like foreign matter 200 can be suppressed.

As described above, each opening portion 81 is larger in opening than opening portion 51. According to such a construction, with opening portion 81, vibration of rod-like foreign matter 200 can be suppressed. Furthermore, lowering in air intake efficiency by vibration suppression member 80 can be prevented.

In some embodiments, foreign matter entry suppression member 50 and fan 60 are distant from each other by an extent of entry of more than half of rod-like foreign matter 200 having the length as above into flow path 100. Thus, component force of centrifugal force of a portion of rod-like foreign matter 200 that protrudes into the vehicle compartment is smaller than component force of centrifugal force of a portion thereof that enters the inside of cooling structure 10. Consequently, protrusion of rod-like foreign matter 200 can be prevented.

Figure 8:
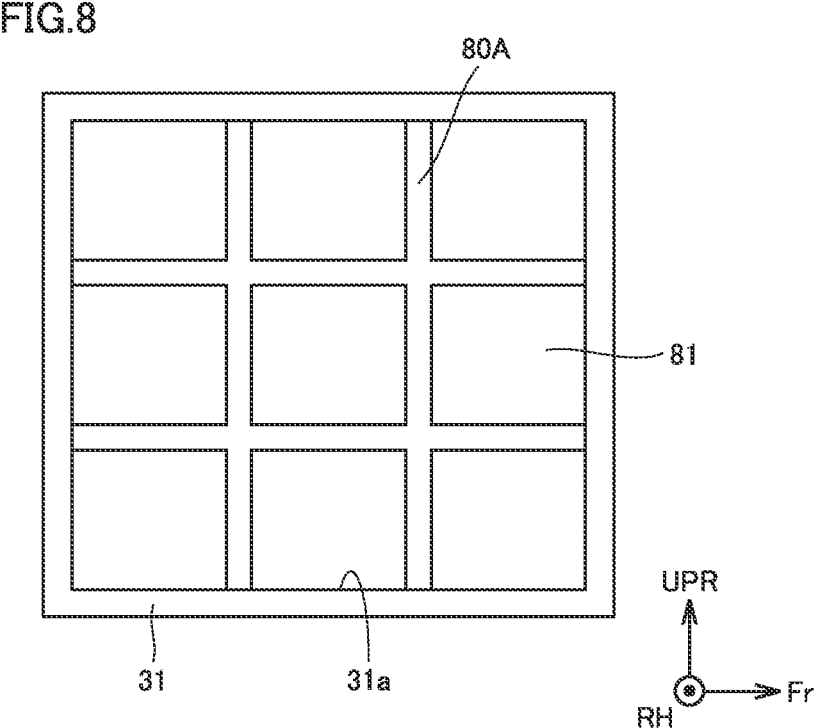
FIG. 8 is a diagram showing a state that a vibration suppression member in another form is set in a flow path.
Figure 9:
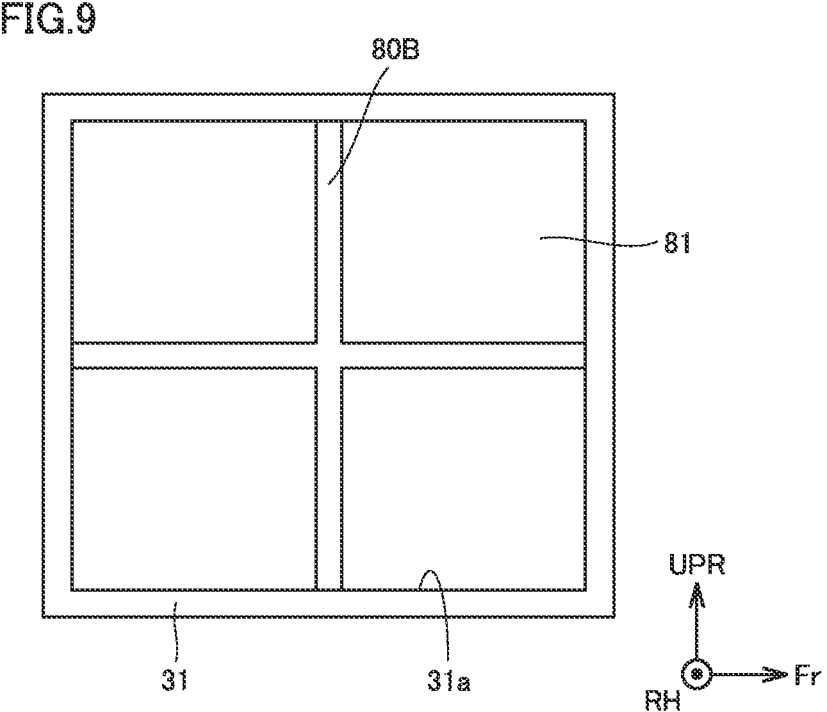
FIG. 9 is a diagram showing a state that a vibration suppression member in yet another form is set in the flow path.
Figure 10:
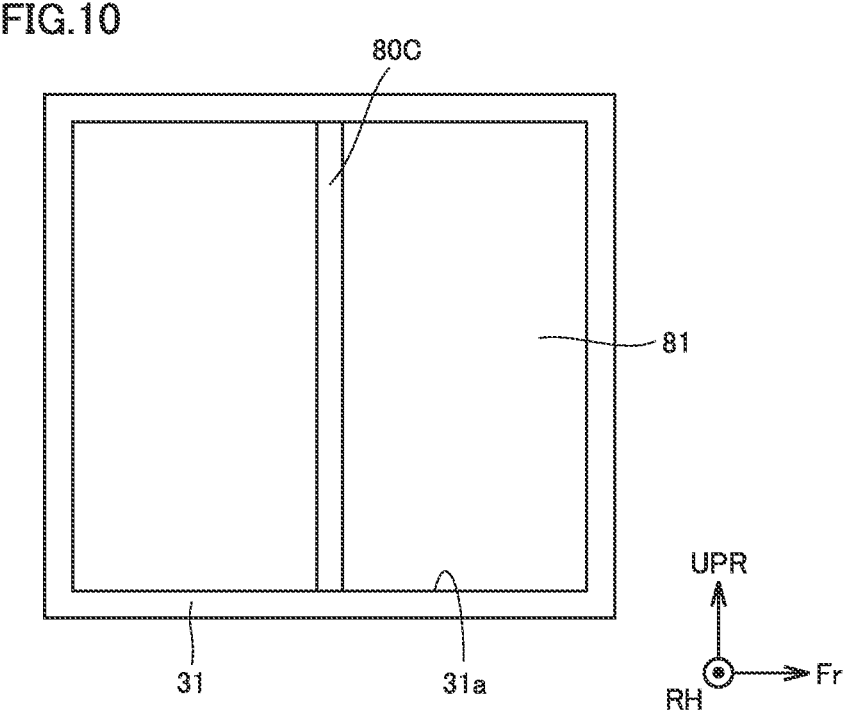
FIG. 10 is a diagram showing a state that a vibration suppression member in still another form is set in the flow path.

Modification (1) The shape of vibration suppression member 80 is not limited to the shape shown in FIG. 3. FIG. 8 is a diagram showing a state that a vibration suppression member 80A representing a first modification of vibration suppression member 80 is set in flow path 100. FIG. 9 is a diagram showing a state that a vibration suppression member 80B representing a second modification of vibration suppression member 80 is set in flow path 100. FIG. 10 is a diagram showing a state that a vibration suppression member 80C representing a third modification of vibration suppression member 80 is set in flow path 100.

As shown in FIG. 8, vibration suppression member 80A is in such a structure that a plurality of ledges are combined in grids. In vibration suppression member 80A, each ledge has an end fixed to an inner wall surface 31a of duct 31. While vibration suppression member 80A is set on inner wall surface 31a, opening portions 81 are provided in matrix.

As shown in FIG. 9, vibration suppression member 80B is in such a structure that two ledges are combined in a cross shape. In vibration suppression member 80B, four ends of the ledges are fixed to inner wall surface 31a of duct 31. In this case as well, while vibration suppression member 80B is set on inner wall surface 31a, opening portions 81 are provided in matrix.

As shown in FIG. 10, vibration suppression member 80C is formed from a single ledge. In vibration suppression member 80C, the single ledge has opposing ends fixed to inner wall surface 31a of duct 31. In this case as well, while vibration suppression member 80C is set on inner wall surface 31a, opening portions 81 are provided in matrix.

Vibration suppression members 80A, 80B, and 80C can also achieve effects similar to those achieved by vibration suppression member 80. Vibration suppression members 80A, 80B, and 80C can be more simplified in structure than vibration suppression member 80.

(2) The construction in which duct 31 and fan 60 are connected to each other and fan 60 and duct 32 are connected to each other is described above by way of example. Without being limited as such, cooling structure 10 may be constructed such that fan 60 is contained in a single duct that extends from inlet 90 to power storage 2.

(3) An example in which opening portion 81 is larger in opening than opening portion 51 is described above by way of example. Without being limited as such, opening portion 81 may be smaller in opening than opening portion 51. Opening portion 81 may be equal in opening size to opening portion 51. According to such a construction as well, the volume of noise produced by vibration of rod-like foreign matter 200 can be lowered and protrusion of rod-like foreign matter 200 into the vehicle compartment can be suppressed.

In an example where opening portion 81 is smaller in opening than opening portion 51, when fan 60 is driven, rod-like foreign matter 200 vibrates with a portion located in opening portion 81 being defined as the fulcrum rather than a portion located in opening portion 51 (supported portion 210 shown in FIG. 7).

(4) Though the construction for cooling the power storage mounted on the vehicle is described above by way of example, the construction can also be used in an application for cooling a power storage set in something other than the vehicle. In such a case, the power storage may be cooled by gas other than air.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A cooling structure that cools a power storage, the cooling structure comprising:
    an inlet for intake toward the power storage;
    a fan including a blade, the fan suctioning gas through the inlet by rotation of the blade and sending the gas toward the power storage;
    a flow path that connects the inlet and the fan to each other;
    a foreign matter entry suppression member provided at the inlet, the foreign matter entry suppression member suppressing entry of a foreign matter into the flow path through the inlet; and
    a vibration suppression member set between the foreign matter entry suppression member and the fan in the flow path and provided to suppress vibration of a rod-like foreign matter caused by rotation of the blade, wherein
    the foreign matter entry suppression member includes a plurality of first opening portions for suction of the gas into the flow path, and
    the vibration suppression member is constructed to be provided with a plurality of second opening portions while the vibration suppression member is set in the flow path.

2. The cooling structure according to claim 1, wherein
    the rod-like foreign matter is moved by contact of a tip end of the rod-like foreign matter with the blade,
    the fan includes a rotation shaft that rotates the blade, and
    the vibration suppression member restricts a range of movement of the rod-like foreign matter in a direction intersecting with an axial direction of the rotation shaft.

3. The cooling structure according to claim 1, wherein
    the second opening portions are each larger in opening than the first opening portions.

4. The cooling structure according to claim 3, wherein
    the vibration suppression member includes a plurality of ledges that intersect with each other or a single ledge.

* * * * *